(12) United States Patent
Chen et al.

(10) Patent No.: US 11,080,132 B2
(45) Date of Patent: Aug. 3, 2021

(54) GENERATING ERROR CHECKING DATA FOR ERROR DETECTION DURING MODIFICATION OF DATA IN A MEMORY SUB-SYSTEM

(71) Applicant: Micron Technology, Inc., Boise, ID (US)

(72) Inventors: Ning Chen, San Jose, CA (US); Juane Li, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 69 days.

(21) Appl. No.: 16/510,559

(22) Filed: Jul. 12, 2019

(65) Prior Publication Data

US 2021/0011799 A1    Jan. 14, 2021

(51) Int. Cl.
  *G06F 11/10* (2006.01)
  *G06F 3/06* (2006.01)

(52) U.S. Cl.
  CPC ........ *G06F 11/1004* (2013.01); *G06F 3/0619* (2013.01); *G06F 3/0653* (2013.01); *G06F 3/0673* (2013.01); *G06F 11/1096* (2013.01)

(58) Field of Classification Search
  CPC .................. G06F 11/1096; G06F 11/1004
  See application file for complete search history.

(56) References Cited

U.S. PATENT DOCUMENTS

| | | | | |
|---|---|---|---|---|
| 5,905,869 A * | 5/1999 | Hornung | .................... | G06F 1/14 709/228 |
| 2018/0074891 A1 * | 3/2018 | Yang | ..................... | H03M 13/13 |
| 2020/0319969 A1 * | 10/2020 | Chu | ..................... | G06F 11/1004 |
| 2020/0409787 A1 * | 12/2020 | Yip | ..................... | G06F 11/1096 |

* cited by examiner

*Primary Examiner* — Steve N Nguyen
(74) *Attorney, Agent, or Firm* — Lowenstein Sandler LLP

(57) ABSTRACT

A request to store a first data is received. The first data and a first error-checking data are received. The first error-checking data can be based on a cyclic redundancy check (CRC) operation of the first data. A second data is generated by removing a portion of the first data. A second error-checking data of the second data is generated by using the first error-checking data and the removed portion of the first data.

19 Claims, 8 Drawing Sheets

GENERATING ERROR CHECKING DATA FOR ERROR DETECTION DURING MODIFICATION OF DATA IN A MEMORY SUB-SYSTEM

TECHNICAL FIELD

Embodiments of the disclosure relate generally to memory sub-systems, and more specifically, relate to generating error checking data for error detection during modification of data in a memory sub-system.

BACKGROUND

A memory sub-system can be a storage device, a memory module, and a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
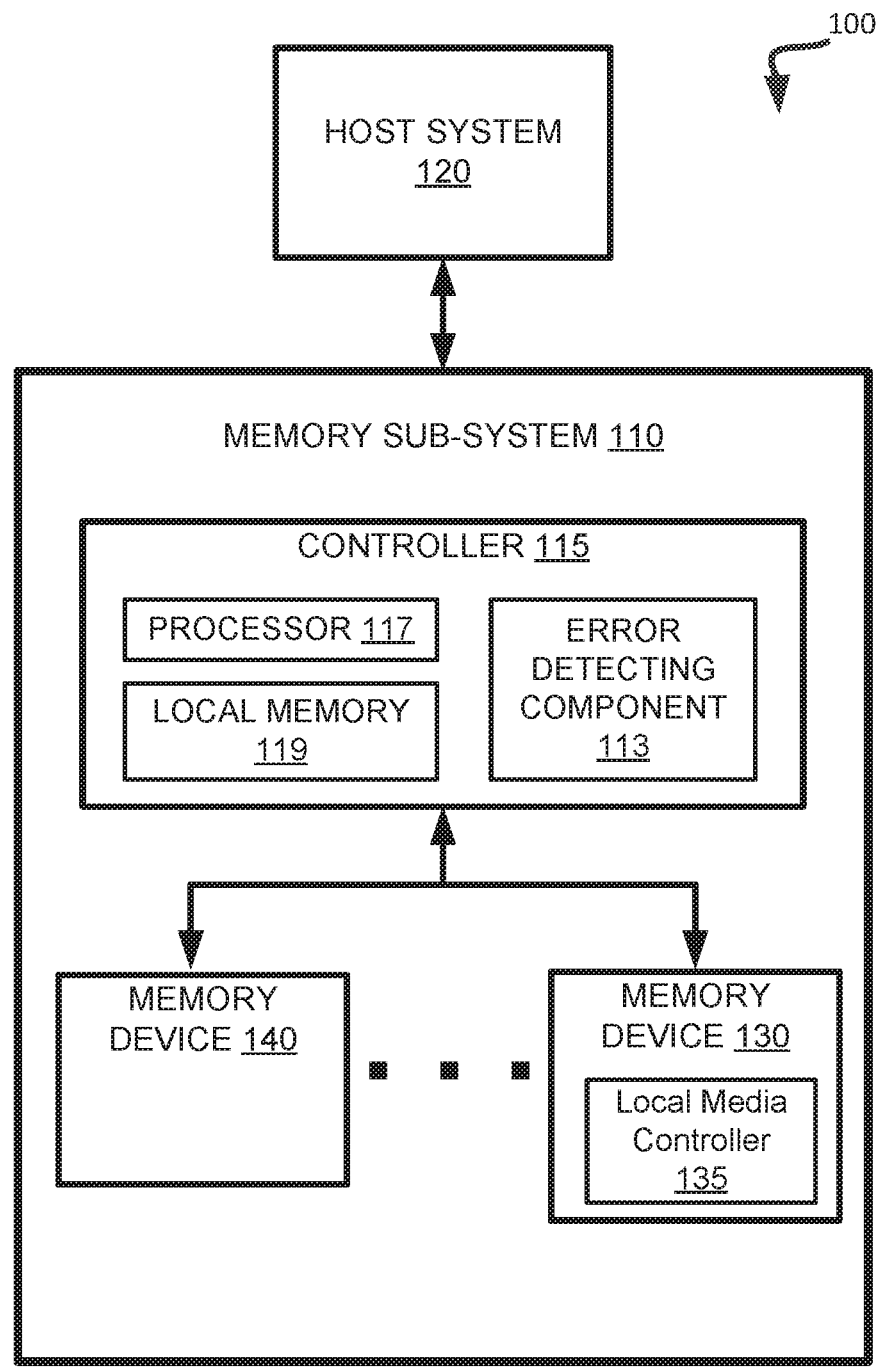
FIG. 1 illustrates an example computing environment that includes a memory sub-system in accordance with some embodiments of the present disclosure.

Aspects of the present disclosure are directed to generating error checking data for error detection during modification of data in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A memory sub-system can receive a message or data appended with a cyclic redundancy check (CRC) code from the host system to store the data and the CRC code to one or more memory components. At a later time, the memory sub-system can modify the original data in various ways, such as truncating the original data and/or appending metadata to the original data. Subsequently, the memory sub-system can store the modified data with the original CRC code (e.g., the CRC code received from the host system).

At a later time, the host system can request the memory sub-system to access the data and the CRC code. In response, the memory sub-system can retrieve the modified data and obtain the original data from the modified data. Then, the memory sub-system can provide the requested data with the original CRC code to the host system. Accordingly, the host system can use the original CRC code and the retrieved data to check whether the retrieved data is corrupted or contains an error. For example, the host system can generate a new CRC code from the retrieved data and can compare the new CRC code with the original CRC code. If the two CRC codes match, then the host system can determine that the retrieved data is valid (e.g., same as the original data requested to be stored). On the other hand, if the two CRC codes do not match, then the host system can determine that the retrieved data is corrupted. In some cases, the memory sub-system, instead of the host system, can validate integrity of the original data using the new CRC code and the original CRC code.

Conventionally, the memory sub-system stores the original CRC code with the data modified by truncation, and/or appending metadata to the data, in order to validate the retrieved data (i.e., the data changed back from the modified data). Since the memory sub-system should store the original CRC code for the host system upon a request to retrieve the data, the memory sub-system cannot check whether and/or where an error has been introduced when the data was modified. For example, an error can be introduced during the modification (e.g., encryption, appending metadata to the original data from the host system) or the reverse-modification (or unmodification) (e.g., decryption, truncation). In order to check for such an error, the memory sub-system needs a CRC code that corresponds to a modified data so that the memory sub-system can compare the corresponding CRC code with a new CRC code generated based on the modified data. If the two CRC codes are the same, then the memory sub-system can determine that no error was introduced during the modification. However, if the memory sub-system replaces the original CRC code with the CRC code for the modified data, then the retrieved data cannot be validated. As such, the conventional memory sub-system cannot identify whether and/or where an error is introduced when storing and retrieving a data for the host system.

Aspects of the present disclosure address the above and other deficiencies by generating an error checking data (e.g., a CRC code) at each modification (e.g., encryption, decryption, appending of metadata, and/or truncation) performed on data received from the host system during storing and/or retrieving the data. According to the aspects of the present disclosure, for storing the data received from the host system by removing a portion of the data (e.g., removing unused metadata), the memory sub-system generates error checking data using error checking data of the data received from the host system and the removed portion of the data received from the host system. For retrieving the data, the memory sub-system generates error-checking data by updating the error checking data corresponding to the modified data with the removed portion of the data received from the host system. According to other aspects of the present disclosure, for storing the data received from the host system by attaching a data pattern for metadata (e.g., a data address, a timestamp) describing system information associated with storing the data, the memory sub-system generates error-checking data using a combination of error-checking data of the data received from the host system and another data pattern at a size that is based on the attached data pattern. For retrieving the data, the memory sub-system generates error-checking data by updating the error-checking data corresponding to the modified data with the data pattern used to generate the error-checking data corresponding to the modified data.

Advantages of the present disclosure include, but are not limited to, ensuring integrity of data during storing and retrieving by detecting when and/or whether an error is introduced during the storing and retrieving of the data and upon the detection, performing a corrective action (e.g., repeating modification and/or reverse-modification). As a result, the reliability of the memory sub-system can be improved.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a negative-and (NAND) type flash memory. Each of the memory devices 130 can include one or more arrays of memory cells such as single level cells (SLCs) or multi-level cells (MLCs) (e.g., triple level cells (TLCs) or quad-level cells (QLCs)). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130.

The memory sub-system 110 includes an error detecting component 113 that can be used to generate error-checking data or codes. In some embodiments, the memory sub-system controller 115 includes at least a portion of the error detecting component 113. For example, the memory sub-system controller 115 can include a processor 117 (processing device) configured to execute instructions stored in local memory 119 for performing the operations described herein. In some embodiments, the error detecting component 113 is part of the host system 110, an application, or an operating system.

The error detecting component 113 can receive a request to store data. The error detecting component 113 can receive data and a corresponding error-checking data. The error detecting component 113 can generate another data by removing a portion of the data. The error detecting component 113 can also generate error-checking data corresponding to the modified data by using the error-checking data received and the removed portion of the received data. Further details with regards to the operations of the error detecting component 113 are described below.

Figure 2A:
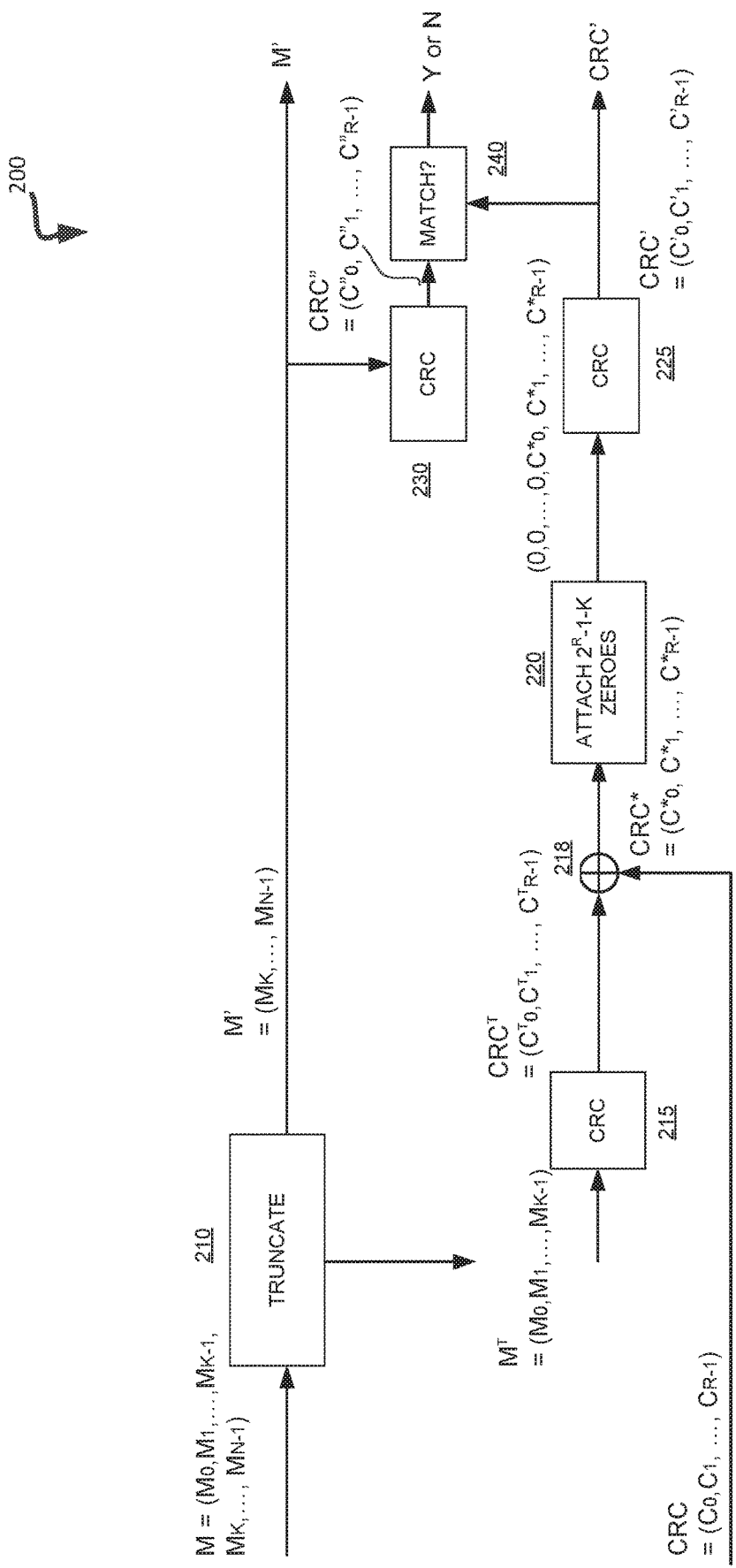
FIG. 2A is a flow diagram of an example method to detect whether an error has been introduced during truncation of data in accordance with some embodiments of the present disclosure.

FIG. 2A is a flow diagram of an example method 200 to detect whether an error has been introduced during truncation of data, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the error detecting component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device receives a message or data (e.g., M) from the host system 120. In some embodiments, the data can include N bits of binary data, such as $M_0$, $M_1$, and etc. The processing device can receive the data as a part of a write request from the host system 120 to store the data. In some embodiments, the processing device can receive the data and error-checking data of the data together in data package. The data package can have the error-checking data appended to the data. In such a case, the processing device can extract the data and the error-checking data from the data package. The error-checking data can include R bits of binary data, such as $C_0$, $C_1$, and etc. The error-checking data (e.g., CRC) can be generated by applying a cyclic redundancy check (CRC) operation to the data M. In some embodiments, any error-checking data generated from the CRC operation would have R bits of binary data.

Further, at operation 210, the processing device truncates the data M to generate the truncated data, M'. In some embodiments, the resulting truncated data M' can have binary numbers with the N−1−K number of bits. That is, the processing device can remove the first K bits of data, $M^T$, from the data M. Then, the processing device stores the truncated data on a memory component 112. This truncation process is to reduce the data size required to store the data in response to the write operation from the host system 120. When the host system 120 later requests to access the data M, the processing device processes data M' to return the data M to the host system 120, as will be described below with respect to FIG. 2B. In addition, at operation 210, the processing device can generate a metadata representing a type of modification-performed on the original data M. The processing device can associate the modified data M' with the original data M for retrieval using the metadata.

After truncating the data M, at operation 215, the processing device generates error-checking data $CRC^T$ of the removed portion $M^T$ by applying the CRC operation to the removed portion $M^T$. Subsequently, at operation 218, the processing device updates the error-checking data, CRC, of the original data M using the error-checking data $CRC^T$ of the removed portion $M^T$. For example, the processing device can combine the error-checking data $CRC^T$ of the removed portion $M^T$ with the error-checking data CRC of the original data M. In some embodiments, the processing device can compute a difference between the two error-checking data, CRC and $CRC^T$ to combine them. In particular, the processing device can apply an exclusive or (XOR) logic function to the two error-checking data, CRC and $CRC^T$. As a result of the update, the processing device generates an incremental error-checking data CRC*. An incremental error-checking data used herein, refers to error-checking data (e.g., a CRC code calculated from the CRC operation) used to incrementally update error-checking data corresponding to an original data to arrive at error-checking data corresponding to data changed from the original data. As such, the processing device can use CRC* as an incremental error-checking data for computing error-checking data (e.g., CRC') of the truncated data M' as will be described below with respect to operations 220 and 225.

At operation 220, the processing device modifies the incremental error-checking data CRC* by attaching a data pattern. For example, the processing device can attach, as a data pattern, a series of the same or any binary numbers (e.g., a value of '0' or '1') to the incremental error-checking data CRC*. The data pattern can have a data size that incorporates the data size, R, of the error-checking data CRC of the original data M or any other CRC (because all error-checking data have the same data size, R), and the data size, K, of the removed portion $M^T$. In some embodiments, the processing device can compute the data size for the data pattern using a mathematical formula '$2^R-1-K$'. That is, the processing device can generate a data pattern having '$2^R-1-K$' number of zeroes. Then, the processing device can attach the data pattern to the incremental error-checking data CRC*. The processing device can attach the data pattern either to the front (i.e., beginning) or end of the incremental error-checking data CRC*.

At operation 225, the processing device generates the error-checking data, CRC', for the truncated data M' by performing the CRC operation on the modified incremental error-checking data CRC*. Accordingly, by incrementally updating the error-checking data CRC of the original data M, the processing device can generate error-checking data CRC' for the modified data M'. Subsequently, the processing device can use CRC' to detect whether there is any error introduced during the truncation as will be described below with respect to operations 230 and 240. Such an error may have been caused by noise or other such impairments (e.g., an alpha particle emitted by packaging materials of the memory sub-system 110 that can cause a value or bit of data stored in a memory cell to switch from a '0' value to a '1' value, or vice versa) when storing the data and/or retrieving the stored data.

At operation 230, the processing device applies the CRC operation to the truncated data M'. Then, at operation 240, the processing device detects whether an error has been introduced during the truncation at operation 210 based on the two error-checking data, CRC' and CRC''. If the two error-checking data have the same value, then the processing device can determine that the truncated data M' is valid. Otherwise, if the two-error-checking data does not match, the processing device can determine that the truncated data M' is not valid due to an error introduced during the truncation at operation 210. As such, by updating the error-checking data (e.g., CRC) of the original data M using the incremental error-checking data (e.g., CRC*), the processing device can generate the error-checking data (e.g., CRC') corresponding to the truncated data M' to be used to detect any error introduced during the modification at operation 210.

In response to determining that the truncated data M' is valid, the processing device can store the truncated data M' with its corresponding error-checking data CRC' in a memory component 112. In such a case where the CRC'' matches CRC', the processing device can store CRC'' instead of CRC'. In further embodiments, the processing device can modify the received data (e.g., M) multiple times. In such a case, the processing device can perform the method 200 each time a modification is performed in order to ensure integrity of modified data and accordingly perform any corrective action.

Figure 2B:
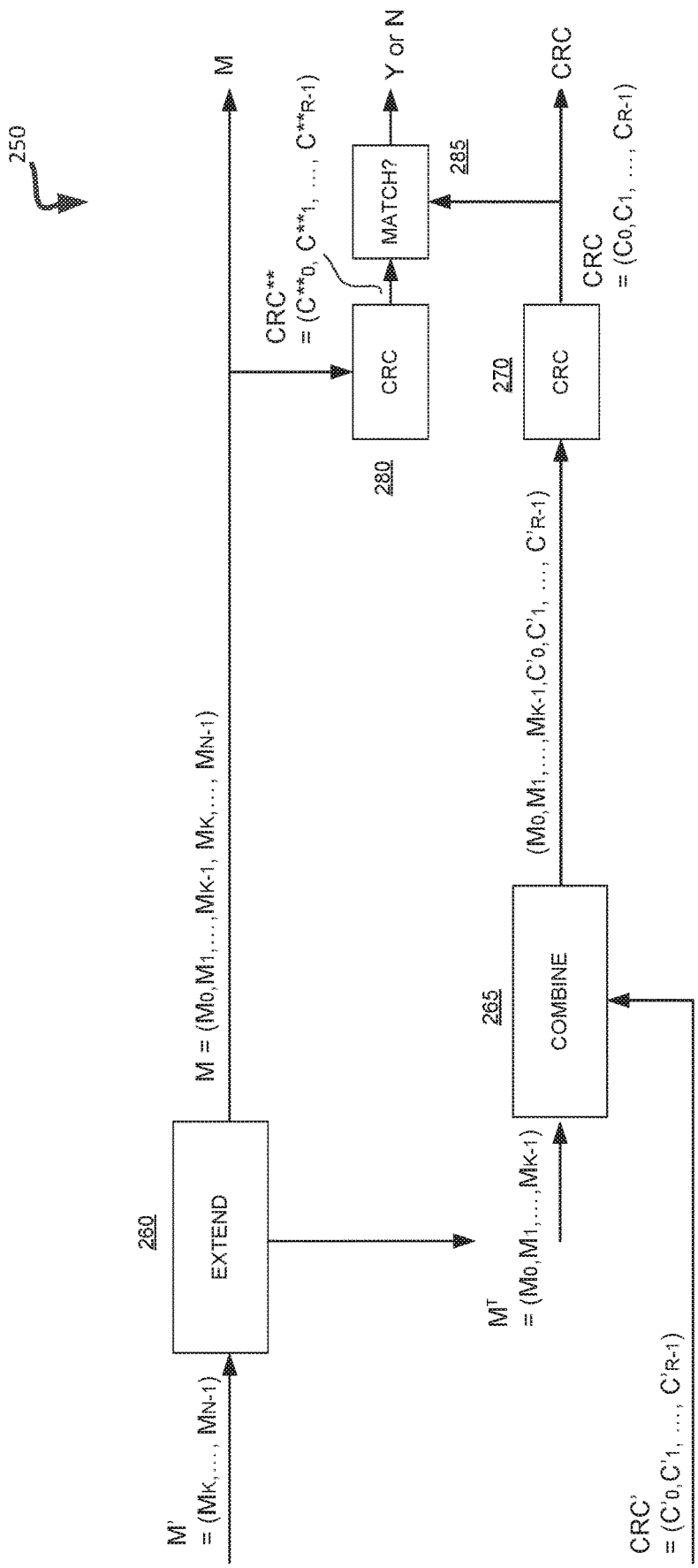
FIG. 2B is a flow diagram of an example method to detect whether an error has been introduced during extension of data in accordance with some embodiments of the present disclosure.

FIG. 2B is a flow diagram of an example method 250 to detect whether an error has been introduced during extension of data, in accordance with some embodiments of the present disclosure. The method 250 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 250 is performed by the error detecting component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 260, the processing device receives a truncated data M'. In some embodiments, the processing device can retrieve the truncated data M' stored in a memory component 112 from the method 200. For example, the truncated data M' can include 'N-1-K' bits of binary data, such as, $M_K$, $M_{K+1}$ ... $M_{N-1}$. In some embodiments, the processing device can access the stored data, M', in response to a retrieval request from the host system 120. The request may be associated with the request to write the data M in FIG. 2A. That is, the host system 120 can send a read operation to the processing device to retrieve the data, M that was transmitted to the processing device for storage. The host system 120 may not be aware of the truncation performed to M. Accordingly, in response to the retrieval request from the host system 120, the processing device can reverse or undo (i.e., extension) the modification associated with the stored data M'. In order to determine how to reverse-modify or undo the modification, the processing device can identify, from the metadata associated with the modified data M', a type of modification performed on the original data M.

Then, the processing device can determine an operation to change the truncated data M' back to the original data M. For example, if the original data M from FIG. 2A has been truncated to M', then the processing device can extend the truncated data M' to obtain the original data M. As a result, the extended data M would have a greater number of bits than the truncated data M'. For example, the extended data M has N number of bits, whereas the truncated data has 'N-1-K' number of bits. During the extension, the processing device can determine the portion $M^T$ that has been removed from the original data M during the truncation. In other words, the processing device can determine the portion $M^T$ that needs to be restored in order to obtain the original data M from the truncated data M'. Once the modified data M' is changed back to the original data M, the processing device provides the original data M to the host system 120 in response to the read operation (unless an error is detected in the extension process as will be described below with respect to operation 285).

At operation 265, the processing device combines the portion $M^T$ with error-checking data (e.g., CRC') corresponding to the retrieved data M'. The processing device can retrieve CRC' that has been stored in the memory component 112 in association with the truncated data M'. To combine the portion $M^T$ with the error-checking data CRC', the processing device can attach the portion $M^T$ to the error-checking data CRC', or vice versa. In some embodiments, the processing device can prepend the portion $M^T$ to the front of the error-checking data CRC'. In other embodiments, the processing device can append the portion $M^T$ to the end of the error-checking data CRC'.

At operation 270, the processing device performs the CRC operation on the combination or the updated error-checking data CRC'. As a result, the processing device has incrementally updated the error-checking data (e.g., CRC') of the truncated data M' to generate the error-checking data CRC for the extended data M. The processing device can provide the host system 120 with the error-checking data CRC of the extended data M in response to the retrieval request.

At operation 280, the processing device applies the CRC operation to the extended data M and generates error-checking data (e.g., CRC). At operation 285, in order to detect whether an error was introduced during the extension at operation 260 or whether the extended data M contains an error, the processing device determines whether the error-checking data CRC of the extended data M matches the error-checking data CRC determined by updating the error-checking data CRC' of the truncated data M' with the portion $M^T$. If the two error-checking data CRC and CRC** match, the processing device can validate that the extended data M does not contain an error. In such a case, the extended data M in FIG. 2B should be the same as the original data M from FIG. 2A received from the host system 120. On the other hand, if the processing determines that the two error-checking data do not match, then the processing device can notify the host system 120 of a failure to retrieve the requested data and/or return to operation 260. In further embodiments, the processing device can perform the method 250 multiple times, if multiple modifications have been applied to the original data M received from the host system 120.

Figure 3A:
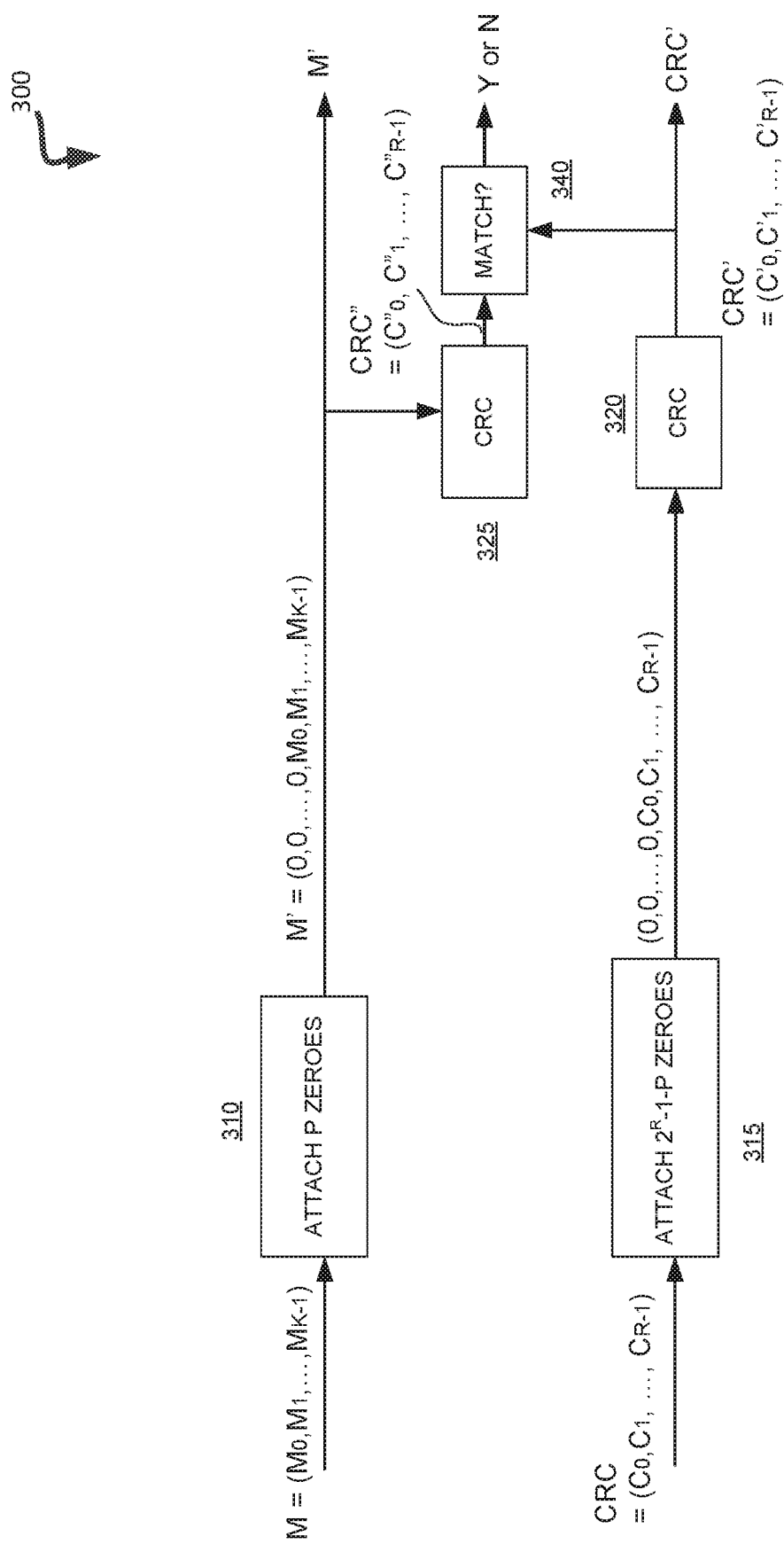
FIG. 3A is a flow diagram of an example method to detect whether an error has been introduced while appending a data pattern to data, in accordance with some embodiments of the present disclosure.

FIG. 3A is a flow diagram of an example method 300 to detect whether an error has been introduced during appending a data pattern to data, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the error detecting component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing device receives a message or data (e.g., M) from the host system 120. In some embodiments, the data can include N bits of binary data, such as $M_0$, $M_1$, and etc. The processing device can receive the data as a part of a write request from the host system 120 to store the data. In some embodiments, the processing device can receive the data and error-checking data of the data together in data package. The data package can have the error-checking data appended to the data. In such a case, the processing device can extract the data and the error-checking data from the data package. The error-checking data can include R bits of binary data, such as $C_0$, $C_1$, and etc. The error-checking data (e.g., CRC) can be generated by applying the CRC operation to the data M. In some embodiments, any error-checking data generated from the CRC operation would have R bits of binary data.

Further, at operation 310, the processing device generates modified data M' by attaching a data pattern (e.g., P zeroes) to the data M. In some embodiments, the processing device can generate a data pattern having a series of the same binary numbers (e.g., a value of '1' or '0'). In other embodiments, the processing device can generate, as a data pattern, a metadata describing system information in binary numbers. Such a data pattern can include system information such as a data address of the generated data (e.g., M') to be stored, a timestamp associated with the generated data M', and/or a flag representing any other system information. After generating a data pattern having a data size of P, the processing device can attach the data pattern to either the front (i.e., beginning) or the end of the data M. For some embodiments, this modification process is to record any system information needed by the memory sub-system 110 in managing a write or read operation on a memory component 112. When the host system 120 later requests to access the data M, the processing device detaches or removes the data pattern from the modified data M' to return the data M to the host system 120, as will be described below with respect to FIG. 3B. In addition, at operation 310, the processing device can generate another metadata representing a type of modification (e.g., attaching a data pattern) performed on the original data M. The metadata for the type of modification can further include content of the data pattern (e.g., a series of binary numbers), a data size (e.g., P) of the data pattern, and a location (e.g., a front or an end) to which the data pattern is attached. The processing device can associate the modified data M' with the original data M for retrieval using the metadata.

At operation 315, the processing device attaches another data pattern (e.g., '$2^R-1-P$' zeroes) to error-checking data, CRC, of the original data M. The processing device can receive CRC from data package having the original data M appended with the CRC. In alternative embodiments, the processing device can generate CRC from the CRC operation of the original data M. In some embodiments, this data pattern can be different from that of operation 310. Although this data pattern can also be a series of the same (or any) binary numbers, a data size of this data pattern is based on a data size (e.g., R) of the error-checking data CRC of the original data M and a data size (e.g., P) of the data pattern of operation 310 associated with modifying the original data M. For example, the processing device can compute a data size of the data pattern using a mathematical formula, '$2^R-1-P$'. After determining the data pattern, the processing device can attach the data pattern to either the front (i.e., beginning) or end of the error-checking data CRC of the original data M.

At operation 320, the processing device generates the error-checking data, CRC', for the modified data M' by performing the CRC operation on the error-checking data CRC updated with the data pattern. Accordingly, by incrementally updating the error-checking data CRC of the original data M, the processing device can generate error-checking data CRC' for the modified data M'. Subsequently, the processing device can use CRC' to detect whether there is any error introduced during the appending operation as will be described below with respect to operations 325 and 340.

At operation 325, the processing device applies the CRC operation to the modified data M' having the attached data pattern. Then, at operation 340, the processing device detects whether an error has been introduced during the modification at operation 310 based on the two error-checking data, CRC' and CRC". If the two error-checking data have the same value, then the processing device can determine that the modified data M' is valid. Otherwise, if the two-error-checking data does not match, the processing device can determine that the modified data M' is not valid due to an error introduced during the attaching operation at operation 310. As such, by updating the error-checking data (e.g., CRC) of the original data M using a data pattern (e.g., '$2^R-1-P$' zeroes), the processing device can generate the error-checking data (e.g., CRC') corresponding the modified data M' to be used to detect any error introduced during the modification at operation 310.

In response to determining that the modified data M' is valid, the processing device can store the modified data M' with its corresponding error-checking data CRC' in a memory component 112. In such a case where the CRC" matches CRC', the processing device can store CRC" instead of CRC'. In further embodiments, the processing device can modify the received data (e.g., M) multiple times. In such a case, the processing device can perform the method 300 each time a modification is performed in order to ensure integrity of modified data and accordingly perform any corrective action.

Figure 3B:
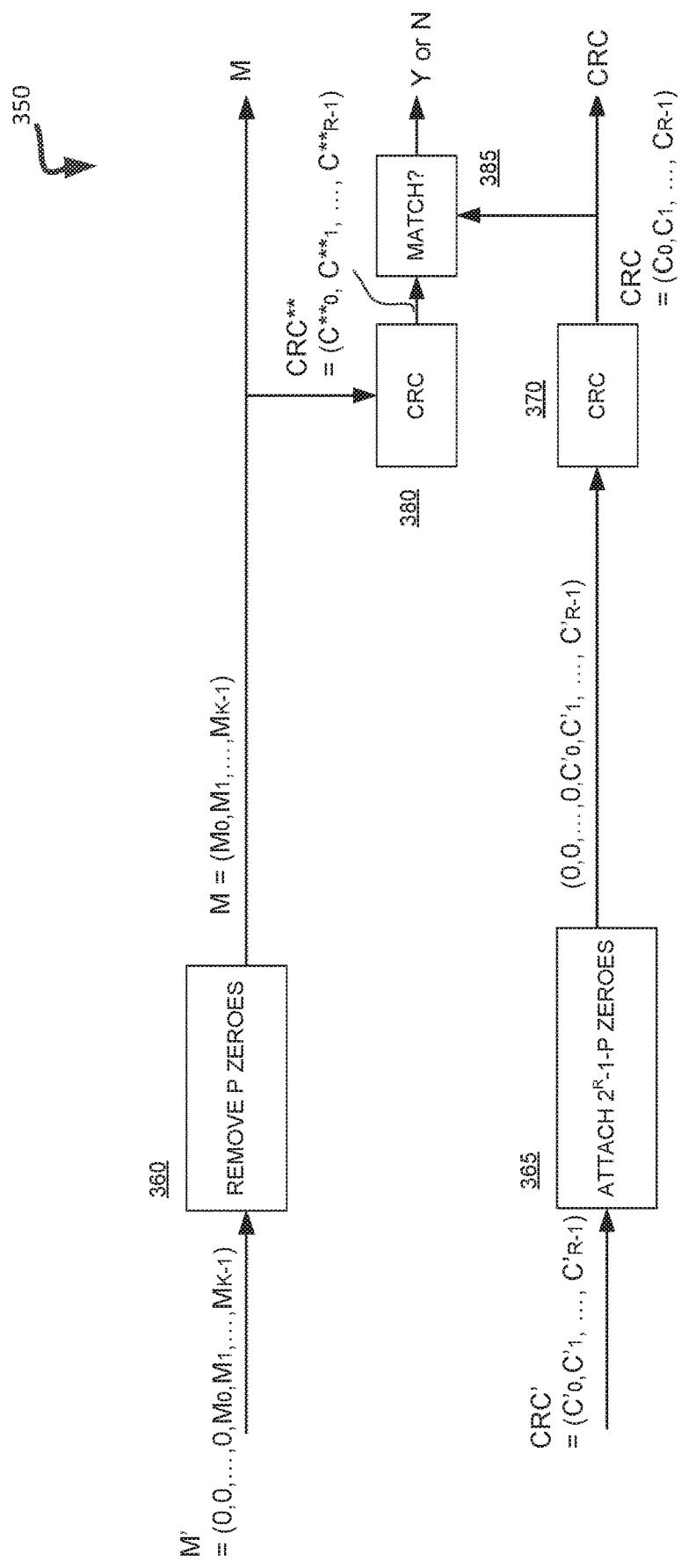
FIG. 3B is a flow diagram of an example method to detect whether an error has been introduced while removing a data pattern from data, in accordance with some embodiments of the present disclosure.

FIG. 3B is a flow diagram of an example method 350 to detect whether an error has been introduced during removal of a data pattern from data, in accordance with some embodiments of the present disclosure. The method 350 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 350 is performed by the error detecting component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 360, the processing device receives a modified data M'. For example, the modified data M' can have 'K+P' number of bits with P bits of data pattern prepended to the front of the original data M having K bits of binary data. In some embodiments, the processing device can retrieve the modified data M' stored in a memory component 112 from the method 300. In some embodiments, the processing device can access the stored data, M', in response to a retrieval request from the host system 120. The request may be associated with the request to write the data M in FIG. 3A. That is, the host system 120 can send a read operation to the processing device to retrieve the data, M that was transmitted to the processing device for storage. The host system 120 may not be aware of the modification performed to M. Accordingly, in response to the retrieval request from the host system 120, the processing device can reverse or undo (i.e., remove the attached data pattern P zeroes) the modification associated with the stored data M'. In order to determine how to reverse-modify or undo the modification, the processing device can identify, from the metadata associated with the modified data M', a type of modification (e.g., attaching a data pattern) performed on the original data M. The processing device can further determine from the metadata content of the data pattern (e.g., a series of binary numbers), a data size of the data pattern, and a location (e.g., a front or an end) to which the data pattern is attached.

Then, the processing device can determine an operation to change the modified data M' back to the original data M. For example, if a data pattern having a data size of P is attached to the front of the original data M from FIG. 3A, then the processing device can remove the data pattern from or truncate the retrieved data M' to obtain the original data M. As a result, the truncated data M would have a less number of bits than the retrieved data M' having the attached data pattern. For example, the truncated data M has K number of bits, whereas the retrieved data M' has 'K+P' number of bits. Once the modified data M' is changed back to the original data M, the processing device provides the original data M to the host system 120 in response to the read operation (unless an error is detected in the removing process as will be described below with respect to operation 385).

At operation 365, the processing device attaches another data pattern to the error-checking data (e.g., CRC') corresponding to the retrieved data M'. The processing device can determine the data pattern to be attached from a series of binary numbers. The data pattern can include the same or any binary numbers. Further, the processing device can determine a size of the data pattern based on the size (e.g., R) of the error-checking data (e.g., CRC') of the retrieved data M' and the size (e.g., P) of the data pattern (e.g., P zeroes) removed from the retrieved data M'. For example, the processing device can use the same mathematical formula '$2^R-1-P$' used at operation 315 to compute a size of the data pattern to be attached. The processing device can retrieve CRC' that has been stored in the memory component 112 in association with the retrieved data M'. In some embodiments, the processing device can prepend the data pattern having the data size of '$2^R-1-P$' to the front of the error-checking data CRC'. In other embodiments, the processing device can append the data pattern to the end of the error-checking data CRC'.

At operation 370, the processing device performs the CRC operation on the modified or updated error-checking data CRC'. As a result, the processing device has incrementally updated the error-checking data (e.g., CRC') of the data M' with the appended data pattern (P zeros) to generate the error-checking data for the truncated data M. The processing device can provide the host system 120 with the error-checking data CRC' of the truncated data M in response to the retrieval request.

At operation 380, the processing device applies the CRC operation to the truncated data M and generates error-checking data (e.g., CRC). At operation 385, in order to detect whether an error was introduced during the removing operation at operation 360 or whether the truncated data M contains an error, the processing device determines whether the error-checking data CRC of the truncated data M matches the error-checking data CRC determined by updating the error-checking data CRC' of the data M' appended with the data pattern having the data size of '$2^R-1-P$'. If the two error-checking data CRC and CRC match, the processing device can validate that the truncated data M does not contain an error. In such a case, the truncated data M in FIG. 3B should be the same as the original data M from FIG. 3A received from the host system 120. On the other hand, if the processing determines that the two error-checking data do not match, then the processing device can notify the host system 120** of a failure to retrieve the requested data or return to operation 360. In further embodiments, the processing device can perform the method 350 multiple times, if multiple modifications have been applied to the original data M received from the host system 120.

Figure 4:
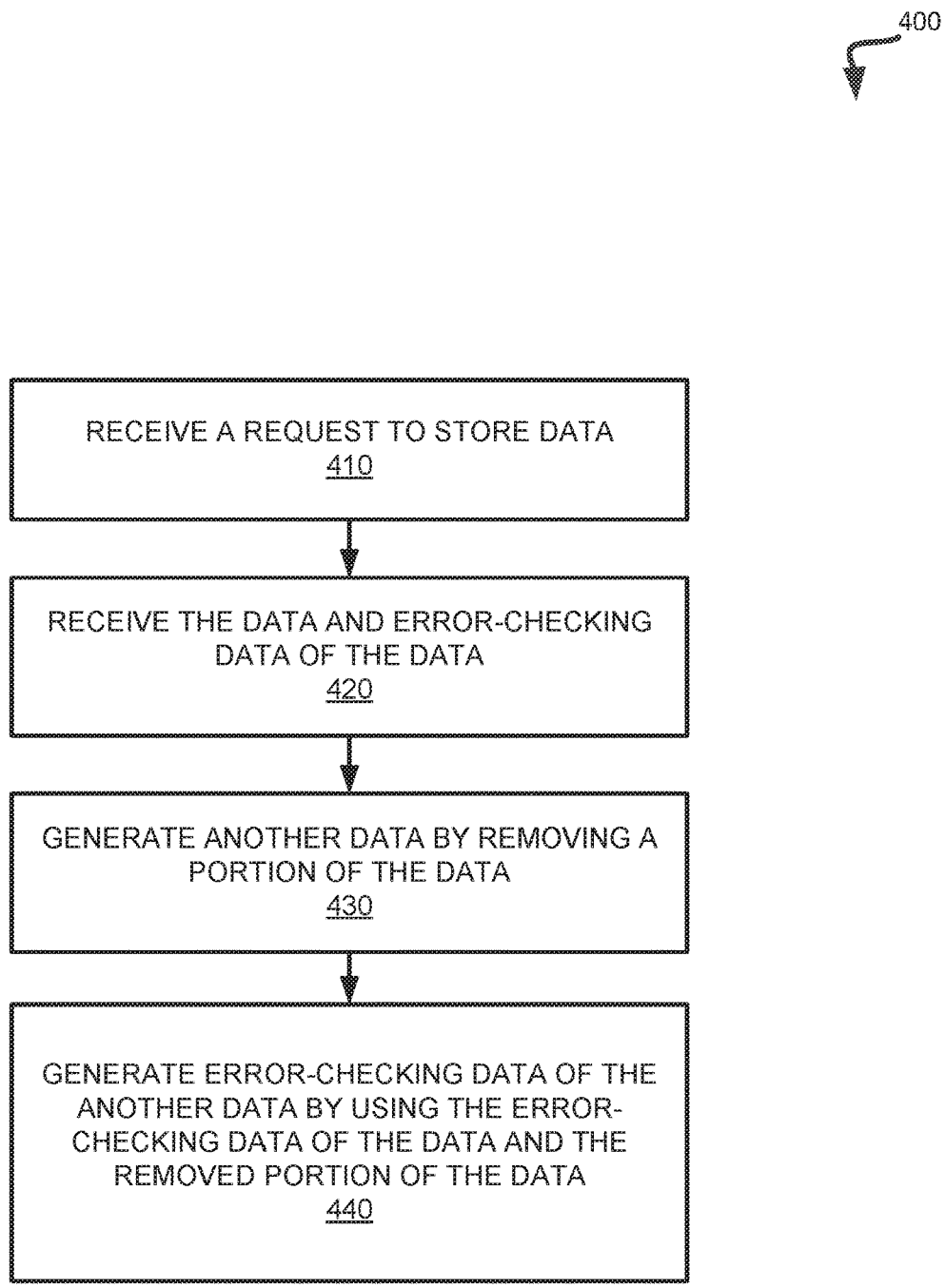
FIG. 4 is a flow diagram of an example method to generate error-checking data, in accordance with some embodiments of the present disclosure.

FIG. 4 is a flow diagram of an example method 400 to generate error-checking data, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the error detecting component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing device receives a request to store data (e.g., M in FIG. 2A). For example, the processing device can receive a request to store the data M as provided by the host system 120. In other embodiments, the processing device can receive the request from the memory sub-system 110.

At operation 420, the processing device receives the data (e.g., M) and error-checking data (e.g., CRC in FIG. 2A) of the data. In some embodiments, the processing device can receive the data with the request. The processing device can receive the data from the host system 120 or the memory sub-system 110. The data can be in a form of a binary number. In further embodiments, after receiving the data, the processing device can create a copy of the received data to perform a corrective action in case an error is detected in relation to operation 430 as will be described below. In some embodiments, the error-checking data can be a cyclic redundancy check code that is generated by applying the CRC operation to the received data. Further, the error checking data can be appended to the received data. In such a case, the processing device can read the error checking data (e.g., CRC) from data package containing the data (e.g., M) and the corresponding error checking data (e.g., CRC). In some embodiments, the processing device can receive the error-checking data from the host system 120 or the memory sub-system 110. The error-checking data can be in a form of a binary number. In some other embodiments, the processing device can perform the CRC operation on the data received to generate the error-checking data for operation 420.

At operation 430, the processing device generates another data (e.g., M' in FIG. 2A) by removing a portion (e.g., $M^T$ in FIG. 2A) of the received data (e.g., M). In some embodiments, the processing device can remove a front portion (e.g., $M^T$) of the data (e.g., M). In other embodiments, the processing device can remove a back portion of the data or anywhere else from the data. For example, the processing device can truncate M and generate M', which is the truncated M having less number of bits as that of M. In some embodiments, the processing device can identify a type of modification (e.g., truncation and/or extension) and store the type of modification along with M', for example, using a metadata.

At operation 440, the processing device generates error-checking data (e.g., CRC' in FIG. 2A) of the other data (e.g., M') by using the error-checking data (e.g., CRC) of the received data (e.g., M) and the removed portion (e.g., $M^T$) of the received data (e.g., M). For example, in order to generate the error-checking data of the data (e.g., M), the processing device can update the error-checking data (e.g., CRC) received at operation 420. The processing device can combine the error-checking data (e.g., CRC) with an error-checking data (e.g., $CRC^T$) generated from the CRC operation of the removed portion (e.g., $M^T$) of the data. In some embodiments, the processing device can combine the received error-checking data (e.g., CRC) with the error-checking data (e.g., $CRC^T$) generated from the removed portion using a difference between the two data. The processing device can determine the difference using the XOR logic function. The error-checking data generated based on the removed portion can be in a form of binary data. As a result of the combination, the processing device generates an incremental error-checking data (e.g., CRC* in FIG. 2A). The incremental error-checking data can be in a form of a binary data. An incremental error-checking data used herein, refers to error-checking data (calculated from the CRC operation) used to incrementally update error-checking data of an original data to arrive at error-checking data of modified data to validate the modified data generated from data modification of the original data to the modified data. As such, the processing device incrementally updates the received error-checking data (e.g., CRC) to the incremental error-checking data (e.g., CRC*) and then to the error-checking data (e.g., CRC') of the modified data (e.g., M') as described in the following description.

After the update, the processing device can generate error-checking data (e.g., CRC') of the modified data (e.g., M') based on the updated error-checking data (e.g., CRC*) and a data pattern at a size that is based on the removed portion (e.g., $M^T$). In some embodiments, the data pattern can correspond to a series of the same binary numbers. Further, the processing device can determine the size of the data pattern using a size of the removed portion (e.g., $M^T$) of the received data and a size of the received error-checking data (e.g., CRC). For example, the processing device can compute the size of the data pattern by subtracting the data size (e.g., K in FIG. 2A) of the removed portion $M^T$ and a value of '1' from a value '2' to the power of the data size (e.g., R in FIG. 2A) of the received error-checking data (e.g., CRC) as described in relation to operation 220 of FIG. 2A (i.e., $2^R-1-K$). Once the processing device determines the size of the data pattern, the processing device can generate a series of '1's or '0's having the determined size. Then, the processing device can modify the updated error-checking data or the incremental error-checking data (e.g., CRC*) by attaching the data pattern. In some embodiments, the processing device can attach the data pattern to a front of the updated error-checking data (e.g., CRC*). The processing device can apply the CRC operation on the combination of the updated error-checking data and the data pattern to generate the error-checking data for the error-checking data (e.g., CRC') of the modified data (e.g., M').

In further embodiments, the processing device can determine whether the data (e.g., M') contains an error. An error can be caused by any impairment that induces a state of a memory cell in a memory component 112 to be flipped to an opposite state (e.g., from a '1' value to a '0' value and vice versa). In some embodiments, the processing device can detect whether an error was introduced during the removing operation at operation 430, by comparing the error-checking data (e.g., CRC') generated for the modified data (e.g., M') with error-checking data (e.g., CRC'' in FIG. 2A) determined by applying the CRC operation to the modified data (e.g., M'). In comparing the two CRCs, the processing device can determine whether a value represented by binary numbers of each CRC is the same. In some embodiments, if the two error-checking data match, then the processing device determines that no error was introduced or the data (e.g., M') modified by the removing operation does not contain an error. In such a case, the processing device can store the modified data (e.g., M') with the error-checking data (e.g., CRC') generated at operation 430 on a memory component in accordance with the request received at operation 410. In storing the modified data (e.g., M'), the processing device can associate the modified data (e.g., M') with the original data (e.g., M) received. The processing device can use an identifier or a metadata for the association. In this way, when the processing device receives a request from the host system 120 to retrieve M, the processing device can access M' based on the association. On the other hand, if the two error-checking data do not match, the processing device can determine that the data modified by the removing operation is corrupted. In some embodiments, the processing device can perform a corrective action by repeating the operation 420 on a copy of the original data received (i.e., re-generating the data having the portion removed). Further, the processing device can notify the host system 120 of a failure to store the requested data.

At a later time, the processing device, from the host system 120, can receive a request to retrieve the data (e.g., M) that has been requested to be stored on a memory component. In response, the processing device can retrieve and modify the stored data (e.g., M' in FIG. 2B) back to the original data (e.g., M in FIG. 2B). For example, the processing device can determine how to recover the original data (e.g., M) by referring to metadata associated with the retrieved data (e.g., M'). The metadata can include a type of truncation and/or extension applicable to the respective data. Accordingly, the processing device can extend the retrieved data (e.g., M') by attaching a data pattern having an appropriate size in order to recover from the truncation. As a result, the processing device can modify the retrieved data (e.g., M') by including or adding the removed portion (e.g., $M^T$ in FIG. 2B) in accordance with information from the metadata. In some embodiments, the processing device can determine the removed portion (e.g., $M^T$) by comparing the retrieved data (e.g., M') with the extended data (e.g., M).

Moreover, in some further embodiments, the processing device can update the error-checking data (e.g., CRC' in FIG. 2B) of the retrieved data (e.g., M') in order to generate error-checking data (e.g., CRC in FIG. 2B) that corresponds to the modified data (e.g., M)—the recovered original data. The CRC' can be stored with M' by being appended to M'. In some embodiments, both the retrieved data and the error-checking data can be in a form of binary data. To update the error-checking data (e.g., CRC'), the processing device can combine the retrieved error-checking data (e.g., CRC') with the removed portion (e.g., $M^T$). For example, the processing device can add or insert the removed portion (e.g., $M^T$) to the retrieved error-checking data (e.g., CRC'). Then, the processing device can update the error-checking data (e.g., CRC') by applying the CRC operation to the combination.

After updating the error-checking data (e.g., CRC'), the processing device can determine whether the modified data (e.g., M) contains an error by comparing the updated error-checking data (e.g., CRC) with an error-checking data (e.g., CRC\*\* in FIG. 2B) generated from the CRC operation of the modified data (e.g., M). In response to determining that the two error-checking data match each other, the processing device can provide the host system 120 with the recovered original data (e.g., M) in accordance with the retrieval request. On the other hand, in case the two error-checking data do not match, the processing device can determine that the modified data (e.g., M) contains the error. In such a case, the processing device can perform operation 430 again. Furthermore, the processing device can notify the host system 120 of the error or a failure to retrieve the requested data.

Figure 5:
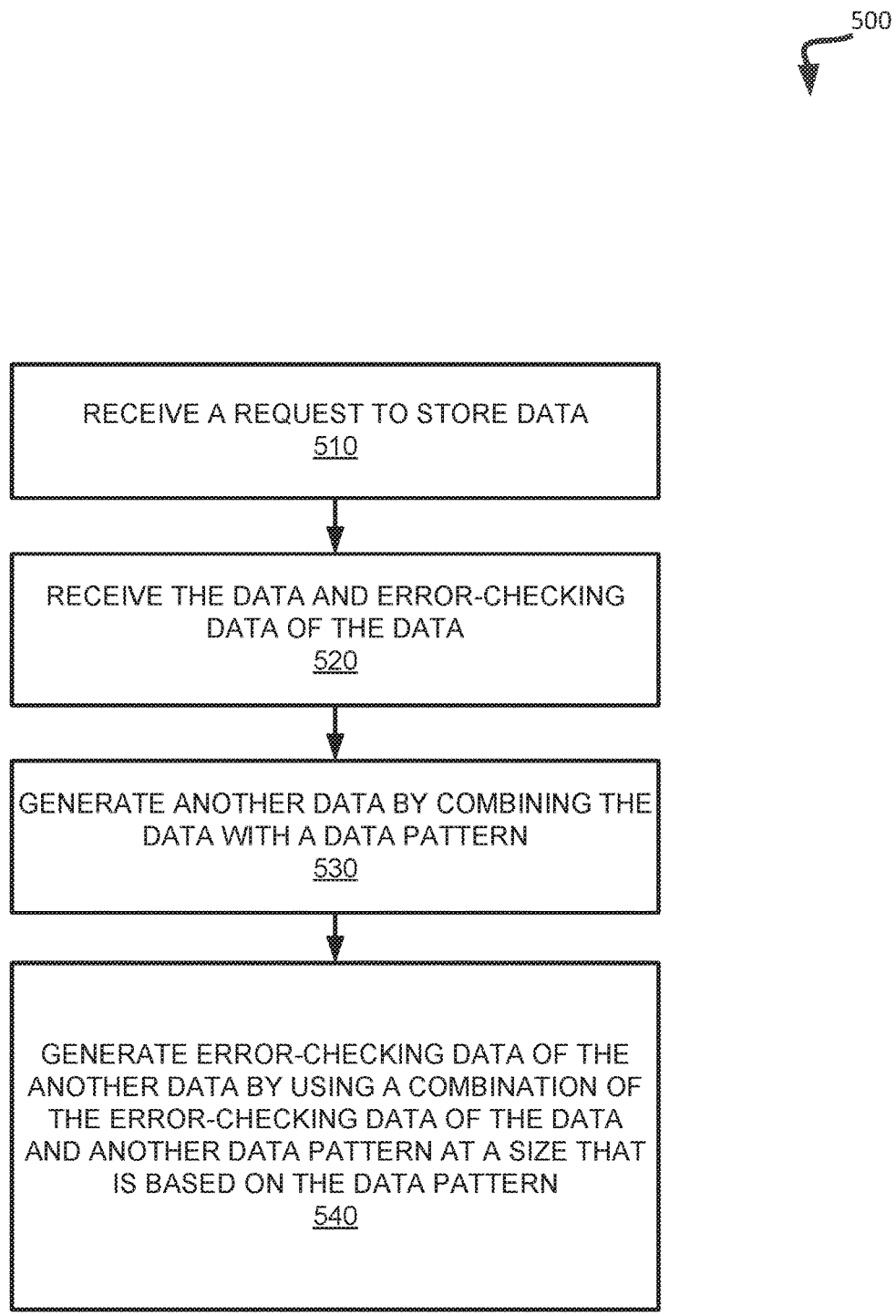
FIG. 5 is a flow diagram of another example method to generate error-checking data, in accordance with some embodiments of the present disclosure.

FIG. 5 is a flow diagram of another example method 500 to generate error-checking data, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the error detecting component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing device receives a request to store data (e.g., M in FIG. 3A). For example, the processing device can receive a request to store the data M as provided by the host system 120. In other embodiments, the processing device can receive the request from the memory sub-system 110.

At operation 520, the processing device receives the data (e.g., M) and error-checking data (e.g., CRC in FIG. 3A) of the data. In some embodiments, the processing device can receive the data with the request. The processing device can receive the data from the host system 120 or the memory sub-system 110. The data can be in a form of a binary number. In further embodiments, after receiving the data, the processing device can create a copy of the received data to perform a corrective action in case an error is detected in relation to operation 530 as will be described below. In some embodiments, the error-checking data can be a cyclic redundancy check code that is generated by applying the CRC operation to the received data. Further, the error checking data can be appended to the data received. In such a case, the processing device can read the error checking data (e.g., CRC) from data package containing the data (e.g., M) and the corresponding error checking data (e.g., CRC). In some embodiments, the processing device can receive the error-checking data from the host system 120 or the memory sub-system 110. The error-checking data can be in a form of a binary number. In some other embodiments, the processing device can perform the CRC operation on the data received to generate the error-checking data for operation 520.

At operation 530, the processing device generates another data (e.g., M' in FIG. 3A) by combining the data (e.g., M) with a data pattern (e.g., P zeroes in FIG. 3A). In some embodiments, the processing device can generate the data pattern that corresponds to a metadata describing system information such as a data address of the generated data (e.g., M') to be stored, a timestamp associated with the generated data (e.g., M'), and/or a flag representing any other system information. The data pattern can be in a form of binary data. In other embodiments, the processing device can generate a series of the same binary number as the data pattern. Then, the processing device can attach the data pattern to the received data. In some embodiments, the processing device can prepend the data pattern to the front of the received data. In other embodiments, the processing device can append the data pattern to the end of the received data. Furthermore, the processing device can identify a type of modification (e.g., attaching a data pattern) and store the type of modification along with M', for example, using the metadata. In some embodiments, the metadata for the type of modification can further include content of the data pattern (e.g., a series of binary numbers), a data size of the data pattern, and a location (e.g., a front or an end) to which the data pattern is attached.

At operation 540, the processing device generates error-checking data (e.g., CRC' in FIG. 3A) of the other data (e.g., M') by using a combination of the error-checking data (e.g., CRC) of the received data (e.g., M) and another data pattern at a size that is based on the data pattern used to generate the other data (e.g., M'). In some embodiments, the processing device can generate another data pattern that corresponds to a series of the same binary numbers (e.g., a value of '0' or '1'). In other embodiments the data pattern can have any series of binary numbers. The processing device can determine a size of this data pattern based on a size (e.g., P) of the data pattern (e.g., P zeroes) used to generate the other data (e.g., M') and a size (e.g., R) of the error-checking data (e.g., CRC) of the data (e.g., M). For example, as illustrated in operations 310 and 315 of FIG. 3A, the data pattern used to update the error-checking data (e.g., CRC) of the received data (e.g., M) can have a data size of '$2^R-1-P$'. Once the data pattern is determined, the processing device can combine the error-checking data (e.g., CRC) of the received data (e.g., M) with the data pattern. For example, the processing device can attach the data pattern having the data size of '$2^R-1-P$' to the error-checking data (e.g., CRC) of the received data (e.g., M). In some embodiments, the processing device can prepend the data pattern to the front of the error-checking data (e.g., CRC). In other embodiments, the processing device can append the data pattern to the end of the error-checking data (e.g., CRC). Subsequently, the processing device generates error-checking data (e.g., CRC') of the modified data (e.g., M') by applying the CRC operation to the combination. As such, similar to operation 440, the processing device can incrementally update the error-checking data (e.g., CRC) of the original data (e.g., M) received by appending the data pattern thereby generating the error-checking data (e.g., CRC') of the modified data (e.g., M'.)

In further embodiments, the processing device can determine whether the data (e.g., M') contains an error. In some embodiments, the processing device can detect whether an error was introduced during the appending operation at operation 530, by comparing the error-checking data (e.g., CRC') generated for the modified data (e.g., M') with error-checking data (e.g., CRC" in FIG. 3A) determined by applying the CRC operation to the modified data (e.g., M'). Similar to the further embodiments described with respect to FIG. 4 above, if the two error-checking data match, then the processing device determines that no error was introduced or the data (e.g., M') modified by the appending operation does not contain an error. In such a case, the processing device can store the modified data (e.g., M') with the error-checking data (e.g., CRC') generated at operation 520 on a memory component in accordance with the request received at operation 510. In storing the modified data (e.g., M'), the processing device can associate the modified data (e.g., M') with the original data (e.g., M) received. The processing device can use an identifier or a metadata for the association. On the other hand, if the two error-checking data do not match, the processing device can determine that the data modified by the appending operation is not valid. In some embodiments, the processing device can perform a corrective action by repeating the operation 530 on a copy of the original data received (i.e., re-generating the data with attached data pattern). Further, the processing device can notify the host system 120 of a failure to store the requested data.

Subsequently, the processing device, from the host system 120, can receive a request to retrieve the data (e.g., M) requested to be stored on a memory component. In response, the processing device can retrieve and modify the stored data (e.g., M' in FIG. 3B) back to the original data (e.g., M in FIG. 3B). For example, the processing device can determine how to recover the original data (e.g., M) by referring to metadata associated with the retrieved data (e.g., M'). The metadata can describe that a particular data pattern is attached to the received data. In some embodiments, the metadata can further specify content of the attached data pattern, a data size of the attached data pattern, as well as a location (e.g., a front or an end) to which the data pattern is attached. Accordingly, the processing device can modify the retrieved data (e.g., M') by removing the data pattern (e.g., P zeroes in FIG. 3B) based on the metadata.

Moreover, in some further embodiments, the processing device can update the error-checking data (e.g., CRC' in FIG. 3B) of the retrieved data (e.g., M') in order to generate error-checking data (e.g., CRC in FIG. 3B) that corresponds to the modified data (e.g., M)—the recovered original data. The CRC' can be stored with M' by being appended to M'. In some embodiments, both the retrieved data and the error-checking data can be in a form of binary data. The processing device can update the retrieved error-checking data (e.g., CRC') based on another data pattern. In some embodiments, this data pattern can be the same data pattern used at operation 540 to generate the retrieved error-checking data (e.g., CRC'). For example, the data pattern can be '$2^R-1-P$' zeroes. Accordingly, the processing device can attach the data pattern to the retrieved error-checking data (e.g., CRC'). In some embodiments, the processing device can prepend the data pattern to the front of the retrieved error-checking data (e.g., CRC'). In other embodiments, the processing device can append the data pattern to the end of the retrieved error-checking data (e.g., CRC'). Then, the processing device can apply the CRC operation to the combination of the retrieved error-checking data (e.g., CRC') and the data pattern having, for example, '$2^R-1-P$' zeroes, thereby generating the updated error-checking data (e.g., CRC in FIG. 3B). The updated error-checking data can be in a form of binary data.

After updating the error-checking data (e.g., CRC'), the processing device can determine whether the modified data (e.g., M) contains an error by comparing the updated error-checking data (e.g., CRC) with an error-checking data (e.g., CRC** in FIG. 3B) generated from the CRC operation of the modified data (e.g., M). In response to determining that the two error-checking data match each other, the processing device can provide the host system 120 with the recovered original data (e.g., M) in accordance with the retrieval request. On the other hand, in case the two error-checking data do not match, the processing device can determine that the modified data (e.g., M) contains the error. In such a case, the processing device can perform operation 530 again. Furthermore, the processing device can notify the host system 120 of the error or a failure to retrieve the requested data.

Figure 6:
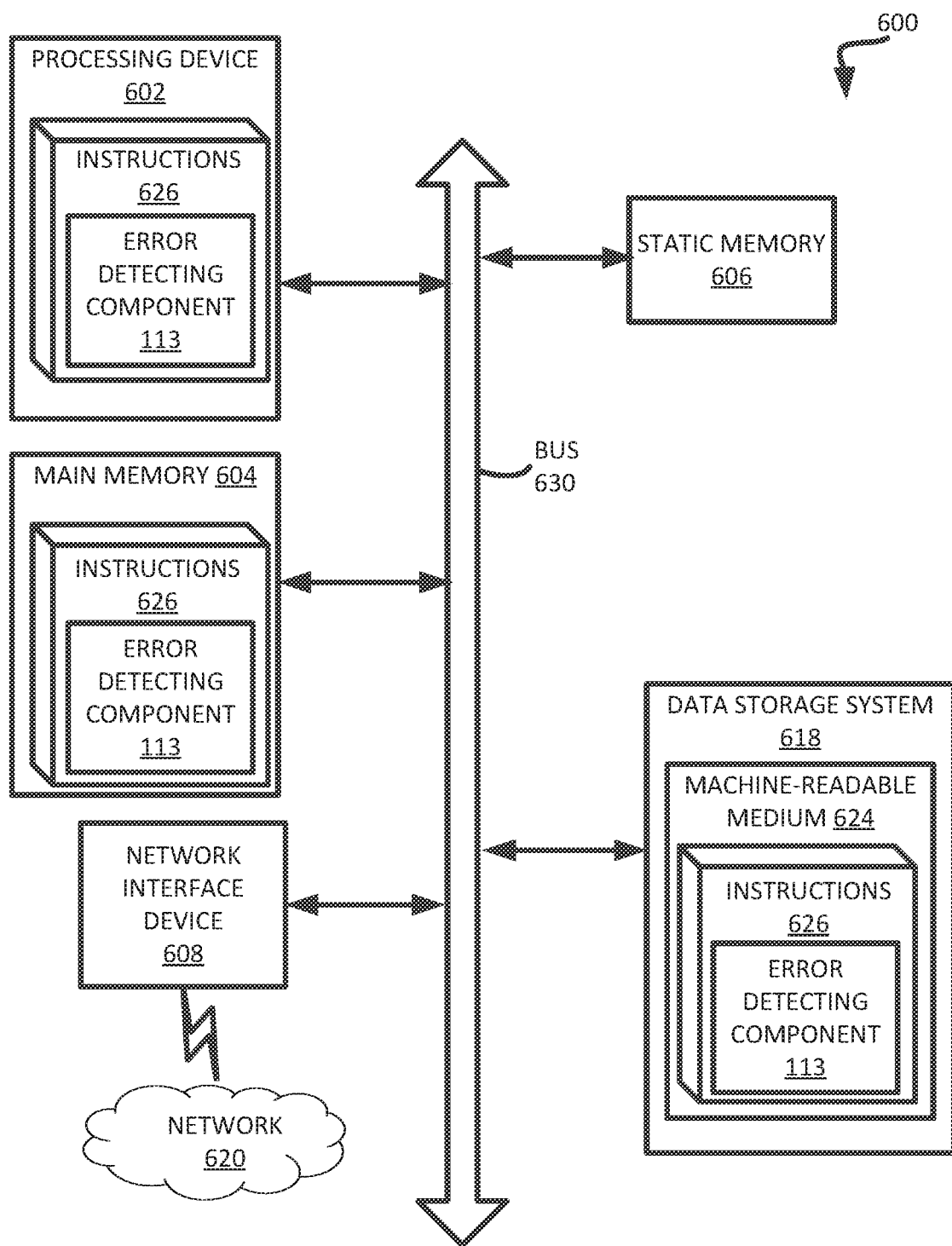
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the error detecting component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an error detecting component (e.g., the error detecting component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a memory component;
    a processing device, operatively coupled with the memory component, to:
        receive a request to store a first data;
        receive the first data and a first error-checking data, the first error-checking data being based on a cyclic redundancy check (CRC) operation of the first data;
        generate a second data by removing a portion of the first data;
        update the first error-checking data based on the portion of the first data that was removed to obtain an updated first error-checking data; and
        generate a second error-checking data of the second data based on the updated first error-checking data and a data pattern having a size that is based on the portion of the first data that was removed.

2. The system of claim 1, wherein to update the first error-checking data, the processing device is to:
    combine the first error-checking data with an error-checking data generated from the CRC operation of the portion of the first data that was removed.

3. The system of claim 1, wherein to generate the second error-checking data, the processing device is to:
    obtain modified first error-checking data by attaching the data pattern to a beginning of the updated first error-checking data; and
    generate the second error-checking data by applying the CRC operation to the modified first error-checking data.

4. The system of claim 1, wherein:
    the data pattern corresponds to a series of same binary numbers; and
    the size of the data pattern is determined using a size of the portion of the first data that was removed and a size of the first error-checking data.

5. The system of claim 1, wherein the processing device is further to:
    determine whether the second data contains an error by comparing the second error-checking data with an error-checking data generated from the CRC operation of the second data;
    in response to determining that the second error-checking data matches the error-checking data generated from the CRC operation of the second data, store the second data with the second error-checking data; and
    in response to determining that the second error-checking data does not match the error-checking data generated from the CRC operation of the second data, re-generate the second data.

6. The system of claim 1, wherein the processing device is further to:
    in response to receiving a request from a host system to retrieve the first data:
        obtain combined data by combining the portion of the first data that was removed with the second data;
        update the second error-checking data based on the removed portion of the first data that was removed to obtain updated second error-checking data;
        determine whether the combined data contains an error by comparing the updated second error-checking data with an error-checking data generated from the CRC operation of the combined data; and
        in response to determining that the updated second error-checking data matches the error-checking data generated from the CRC operation of the combined data, provide the host system with the combined data.

7. The system of claim 6, wherein to update the second error-checking data, the processing device is to:
    combine the second error-checking data with the portion of the first data that was removed to obtain a combination; and
    update the second error-checking data by applying the CRC operation to the combination.

8. A method comprising:
    receiving, by a processing device, a request to store a first data;
    receiving, by the processing device, the first data and a first error-checking data, the first error-checking data being based on a cyclic redundancy check (CRC) operation of the first data;
    generating, by the processing device, a second data by removing a portion of the first data;
    updating, by the processing device, the first error-checking data based on the portion of the first data that was removed to obtain an updated first error-checking data; and
    generating, by the processing device, a second error-checking data of the second data based on the updated first error-checking data and a data pattern having a size that is based on the portion of the first data that was removed.

9. The method of claim 8, wherein updating the first error-checking data comprises:
    combining the first error-checking data with an error-checking data generated from the CRC operation of the portion of the first data that was removed.

10. The method of claim 8, wherein generating the second error-checking data comprises:
    obtaining modified first error-checking data by attaching the data pattern to a beginning of the updated first error-checking data; and
    generating the second error-checking data by applying the CRC operation to the modified first error-checking data.

11. The method of claim 8, wherein:
    the data pattern corresponds to a series of same binary numbers; and the size of the data pattern is determined using a size of the portion of the first data that was removed and a size of the first error-checking data.

12. The method of claim 8, further comprising:
   determining whether the second data contains an error by comparing the second error-checking data with an error-checking data generated from the CRC operation of the second data;
   in response to determining that the second error-checking data matches the error-checking data generated from the CRC operation of the second data, storing the second data with the second error-checking data; and
   in response to determining that the second error-checking data does not match the error-checking data generated from the CRC operation of the second data, re-generating the second data.

13. The method of claim 8, further comprising:
   in response to receiving a request from a host system to retrieve the first data:
      obtaining combined data by combining the portion of the first data that was removed with the second data;
      updating the second error-checking data based on the portion of the first data that was removed to obtain updated second error-checking data;
      determining whether the combined data contains an error by comparing the updated second error-checking data with an error-checking data generated from the CRC operation of the combined data, and
      in response to determining that the updated second error-checking data matches the error-checking data generated from the CRC operation of the combined data, providing the host system with the combined data.

14. A non-transitory computer-readable storage medium comprising instructions that, when executed by a processing device, cause the processing device to perform operations comprising:
   receiving a request to store a first data;
   receiving the first data and a first error-checking data, the first error-checking data being based on a cyclic redundancy check (CRC) operation of the first data;
   generating a second data by removing a portion of the first data;
   updating the first error-checking data based on the portion of the first data that was removed to obtain an updated first error-checking data; and
   generating, by a processing device, a second error-checking data of the second data based on the updated first error-checking data and a data pattern having a size that is based on the removed portion of the first data.

15. The non-transitory computer-readable storage medium of claim 14, wherein updating the first error-checking data comprises:
   combining the first error-checking data with an error-checking data generated from the CRC operation of the portion of the first data that was removed.

16. The non-transitory computer-readable storage medium of claim 14, wherein generating the second error-checking data comprises:
   obtaining modified first error-checking data by attaching the data pattern to a beginning of the updated first error-checking data; and
   generating the second error-checking data by applying the CRC operation to the modified first error-checking data.

17. The non-transitory computer-readable storage medium of claim 14, wherein:
   the data pattern corresponds to a series of same binary numbers; and
   the size of the data pattern is determined using a size of the portion of the first data that was removed and a size of the first error-checking data.

18. The non-transitory computer-readable storage medium of claim 14, wherein the operations further comprise:
   determining whether the second data contains an error by comparing the second error-checking data with an error-checking data generated from the CRC operation of the second data;
   in response to determining that the second error-checking data matches the error-checking data generated from the CRC operation of the second data, storing the second data with the second error-checking data; and
   in response to determining that the second error-checking data does not match the error-checking data generated from the CRC operation of the second data, re-generating the second data.

19. The non-transitory computer-readable storage medium of claim 14, wherein the operations further comprise:
   in response to receiving a request from a host system to retrieve the first data:
      obtaining combined data by combining the portion of the first data that was removed with the second data;
      updating the second error-checking data based on the portion of the first data that was removed to obtain updated second error-checking data;
      determining whether the combined data contains an error by comparing the updated second error-checking data with an error-checking data generated from the CRC operation of the combined data, and
      in response to determining that the updated second error-checking data matches the error-checking data generated from the CRC operation of the combined data, providing the host system with the combined data.

* * * * *